(12) United States Patent
Perata

(10) Patent No.: US 6,691,606 B2
(45) Date of Patent: Feb. 17, 2004

(54) HYDRAULIC DEVICE WITH PISTON AND ACTUATING ROD, WITH TEMPORARY RANGE-OF-TRAVEL END STOP FOR PURGING

(75) Inventor: Paolo Perata, Saint Ouen (FR)

(73) Assignee: Valeo, Paris (FR)

( * ) Notice: Subject to any disclaimer, the term of this patent is extended or adjusted under 35 U.S.C. 154(b) by 63 days.

(21) Appl. No.: 10/050,760

(22) Filed: Jan. 18, 2002

(65) Prior Publication Data

US 2002/0096045 A1 Jul. 25, 2002

(30) Foreign Application Priority Data

Jan. 24, 2001 (FR) .......................................... 01 01049

(51) Int. Cl.[7] ............................................... F15B 15/26
(52) U.S. Cl. ......................................................... 92/23
(58) Field of Search ............................................. 92/23

(56) References Cited

U.S. PATENT DOCUMENTS 4,557,361 A * 12/1985 Nix et al. ....................... 92/23
4,581,979 A * 4/1986 Compton et al. ............... 92/23

* cited by examiner

Primary Examiner—F. Daniel Lopez
(74) Attorney, Agent, or Firm—Liniak, Berenato & White

(57) ABSTRACT

The invention proposes a hydraulic device of the kind including a cylinder in which a piston is mounted for sliding in leaktight fashion in the body of the cylinder so as to delimit at least one hydraulic chamber intended to be linked to a hydraulic circuit, and is linked to the front extremity of an actuating rod which projects axially rearwardly outside the cylinder body and on which an actuating force can be applied in order to cause forward displacement of the piston counter to a return force applied to the piston. The device includes a temporary end stop which limits the forward displacement of the piston and which intervenes until the piston is first actuated by means of the actuating rod. The invention is applicable to a hydraulic cylinder for the control of motor-vehicle equipment.

6 Claims, 2 Drawing Sheets

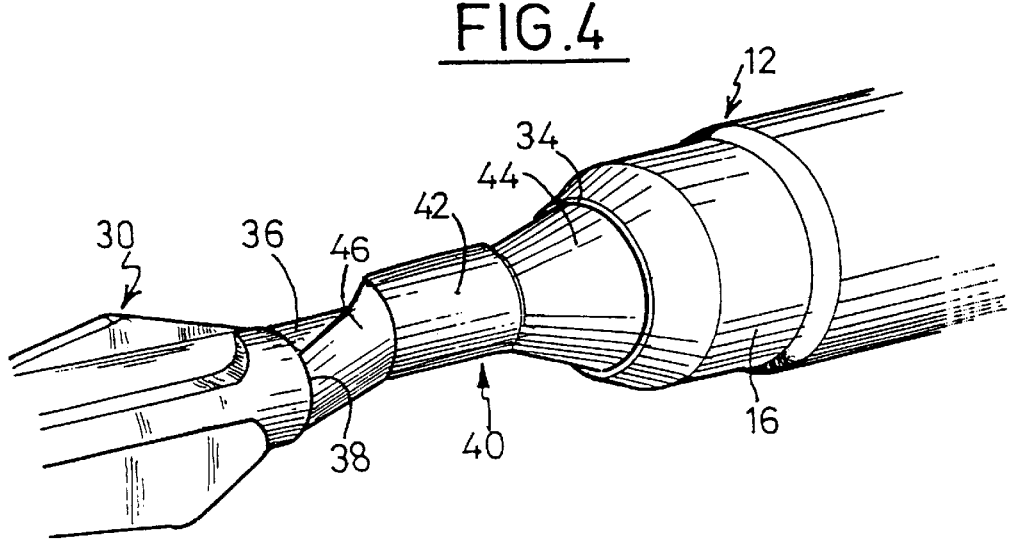
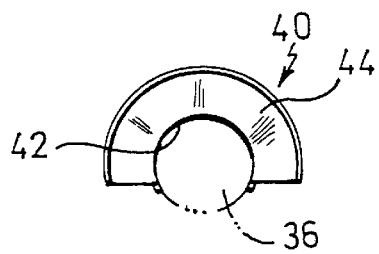
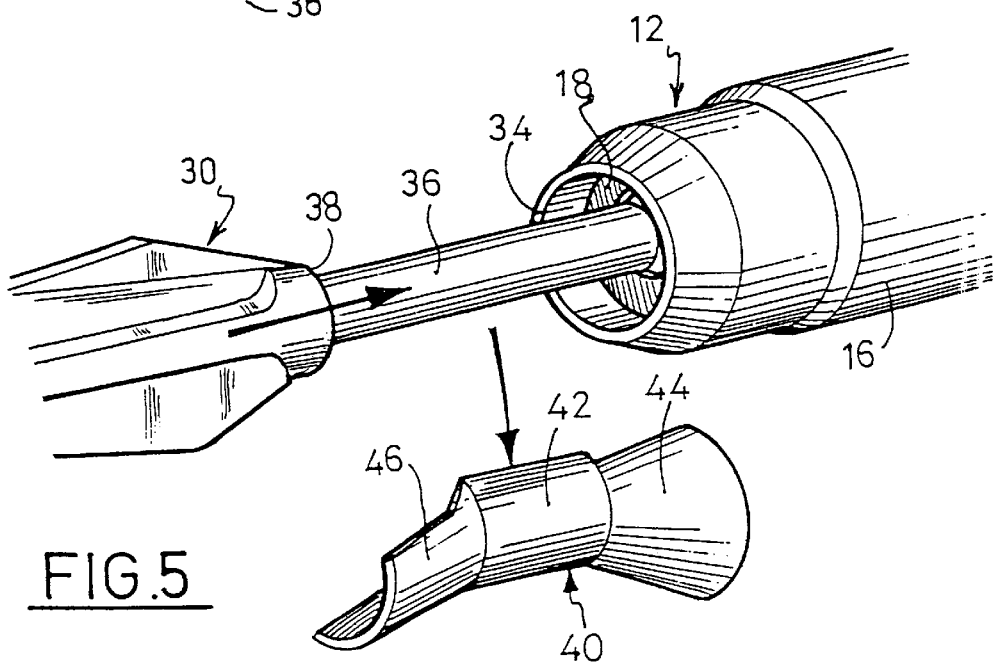

HYDRAULIC DEVICE WITH PISTON AND ACTUATING ROD, WITH TEMPORARY RANGE-OF-TRAVEL END STOP FOR PURGING

FIELD OF THE INVENTION

The present invention relates to a hydraulic device of the kind including a cylinder in which a piston slides in a leaktight fashion so as to delimit at least one chamber intended to be linked to a hydraulic circuit.

The invention especially concerns such a device intended to be used in association with motor-vehicle equipment. The invention may relate, for example, to a hydraulic transmitter for control of a clutch or for actuating the brakes of the vehicle.

BACKGROUND OF THE INVENTION

In these applications, the device, with other components such as ducts, a reservoir, one or more hydraulic receivers, etc, forms part of a hydraulic circuit the correct operation of which requires that, after it has been filled with liquid, it is purged of any air or other gas which it might contain.

To that end, it is known to place the hydraulic chamber delimited by the piston under negative pressure with a view to making the liquid circulate, and to expel any air bubbles, especially by using the passage for automatic resupplying of the cylinder with liquid which is linked to the outside so as to communicate with the reservoir.

However, in order for this passage to be clear, it is necessary for the piston to be either in its rest position, or in a position close to it, to which it is normally drawn back by a return spring of rated value arranged inside the cylinder.

In normal use of the transmitter, the driver has to overcome the return force in order to shift the piston and cause the hydraulic circuit to be placed under pressure.

When the chamber is placed under negative pressure with a view to purging the circuit, the piston has a tendency to be displaced forward counter to the force which is applied to it by the return spring. If the application of negative pressure causes a sufficient forward displacement of the piston, the resupply passageway is blocked and the purging circuit is interrupted.

Furthermore, it is impossible to increase the rated value of the force exerted by the return spring, since too high a value impairs the ergonomics and comfort of the transmitter in normal use.

SUMMARY OF THE INVENTION

In order to remedy these drawbacks, the invention proposes a hydraulic device of the kind including a cylinder in which a piston is slidingly mounted in leaktight fashion in the body of the cylinder so as to delimit at least one hydraulic chamber intended to be linked to a hydraulic circuit, and is linked to the front extremity of an actuating rod which projects axially rearward outside the cylinder body and on which an actuating force can be applied in order to cause forward displacement of the piston with respect to the cylinder body, wherein it includes a temporary end stop which limits the forward displacement of the piston and which intervenes until the piston is first actuated by means of the actuating rod.

By virtue of such a configuration, the forward displacement of the piston resulting from the chamber being placed under negative pressure is limited to a predetermined range of travel which is chosen to correspond to a position of the piston in which the radially inner extremity of the resupply passage is always open.

According to other characteristics of the invention:

the temporary end stop limits the axial forward displacement of the rod, with respect to the cylinder body, in such a way as to be arranged outside the device in order to be easily put in place or removed;

the temporary end stop is a component affixed onto the actuating rod or onto the cylinder body, which is capable of occupying a fitted, end-stop position and a retracted position.

the end stop is preferably affixed by elastic clipping in order to allow it to be put in place and removed without any special tool;

the end stop includes means forming a ramp which interact with a facing portion of the cylinder body and/or of the actuating rod in order to cause automatic unclipping of the end stop under the effect of the actuating force applied to the actuating rod which entails a relative forward displacement of the rod with respect to the cylinder body;

the end stop includes a central fixing segment in the form of an elastic clip capable of being clipped elastically, along the radial direction, onto a complementary segment of the actuating rod;

the end stop, at at least one of the extremities of its central fixing segment, includes a free end segment shaped into an inclined ramp and which is capable of interacting with a facing surface of the rear extremity of the cylinder body or of a radial shoulder of the actuating rod so as to cause the end stop to be disengaged in an overall radially outward direction;

in position, fitted on the actuating rod, the end stop is mounted for sliding axially along the actuating rod.

Other characteristics and advantages of the invention will emerge on reading the detailed description which follows and which is given by way of non-limiting example.

BRIEF DESCRIPTION OF THE DRAWINGS

FIG. 4 is a view in perspective, on a larger scale, of a detail of FIG. 3;

FIG. 5 is a view similar to that of FIG. 4 which illustrates the automatic unclipping of the end-stop element upon actuation of the pedal;

FIG. 6 is an axial end view of the end-stop element.

DESCRIPTION OF THE PREFERRED EMBODIMENTS

The invention will be described, in a non-limiting way, with reference to a transmitter cylinder for the hydraulic control of a motor-vehicle clutch mechanism.

Figure 1:
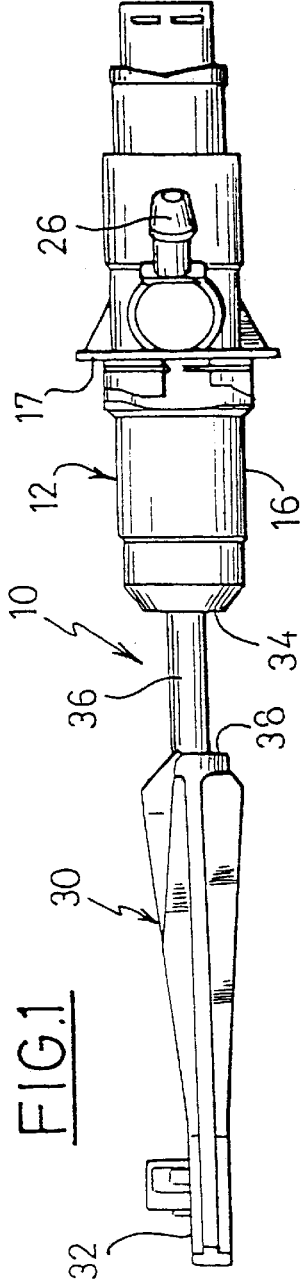
FIG. 1 is an outside view of a hydraulic clutch transmitter without the temporary end stop according to the invention.

For the description, a back-front orientation will be adopted, from left to right when considering FIG. 1, corresponding to the direction A of actuation from the rear forward.

The device constituted by the transmitter 10 consists essentially of a hydraulic cylinder 12 and of an actuating rod 30.

Figure 2:
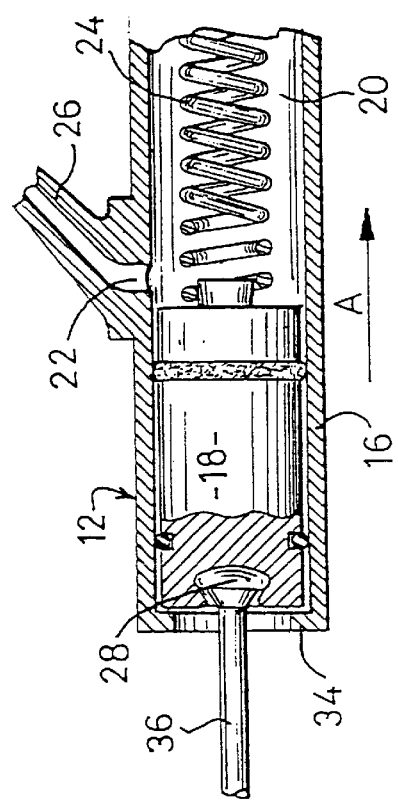
FIG. 2 is a partial diagrammatic view in axial section of the cylinder of the transmitter.

The cylinder 12 consists essentially of a tubular body 16 in which, as can be seen in the diagram of FIG. 2, a piston 18 is mounted sliding in a leaktight fashion so as to delimit a front chamber 20 which opens out at the front axial extremity of the cylinder 12 in order to be linked to a hydraulic circuit, not represented.

When the piston 18 is in a rear, rest position, towards which it is drawn back elastically by a compression spring 24, a radial orifice or passage 22 for resupply of the chamber by a reservoir, not represented, is open, that is to say the chamber 20 is in communication with the outside via a union 26 belonging to the body 16 of the cylinder.

The piston 18 is linked to the front extremity 28 of an actuating rod 30 which extends axially rearward outside the tubular body 16 in such a way that its 3 rear extremity 32 can be linked to an actuating mechanism such as a clutch pedal, not represented.

The tubular body 16 is delimited externally to the rear by an annular transverse face 34.

The tubular body 16 also includes means, here a flange 17, for fixing it onto a fixed structural element of the vehicle, such as the front bulkhead, for example.

The intermediate segment 36 of the rod 30 which extends rearward at the exit from the body 16 is a cylindrical segment here, of constant circular cross-section, which is terminated by a transverse shoulder surface 38 oriented forward.

In accordance with the teachings of the invention, the transmitter 10 is capable of including a removable or dismountable temporary end stop 40 which makes it possible to limit the range of forward axial travel of the piston 18 with respect to the cylinder body 16 as long as a predetermined force has not been applied to the actuating rod 30.

To that end, the end stop 40 takes the form of a wedge which is interposed axially between the actuating rod 30, 36, 38 and the rear part 34 of the body of the cylinder, more precisely between the rear 34 and front 38 transverse faces.

The wedge-forming temporary end stop is an affixed component 40 which is a molded plastic piece which is fixed temporarily onto the rod 30, 36 by elastic clipping.

More precisely, the end stop or wedge 40 includes an intermediate mounting or fixing segment 42 which, in cross-section, is a semicylindrical tubular segment which extends in angle over more than a semicircle so as to constitute an elastically deformable clip which can be clipped, or unclipped respectively, radially by elastic deformation on the cylindrical segment 36 of the actuating rod 30.

On either side of the central mounting segment 42, the end stop 40 includes a free front-end segment 44 and a free rear-end segment 46 which are shaped as a tubular conical section and each of which constitutes a ramp, here a frustoconical concave ramp, which is capable of interacting with the rear 34 and front 38 transverse face respectively, as will be explained in what follows, in order to cause the automatic unclipping of the end stop 40 from the rod 30, 36.

Figure 3:
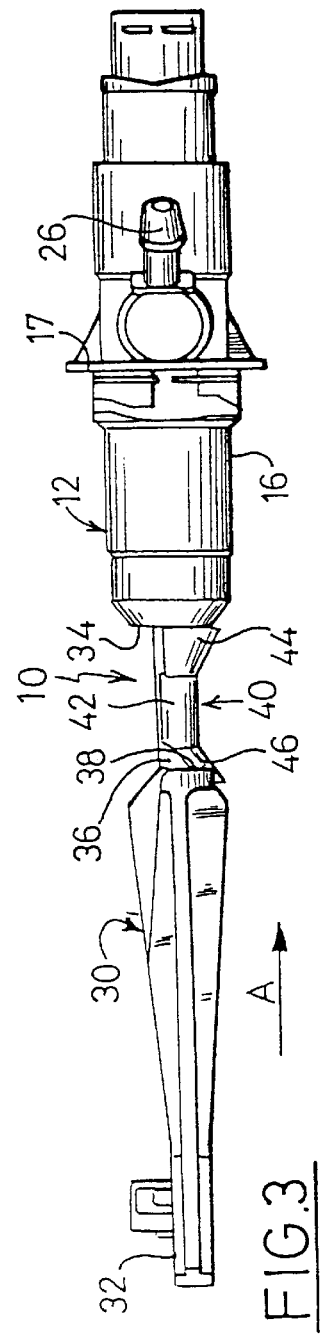
FIG. 3 is a view similar to that of FIG. 1, on which the rod of the transmitter is equipped with the temporary end-stop element according to the invention.

In rest or starting position of the piston 18 and of the rod 30 with respect to the cylinder 12, 16 (see FIGS. 2 and 3), the wedge or end stop 40 is mounted in place on the segment 36 of the rod 30 and its total axial length is such that the ramp-forming front segment 44 extends, with a slight axial play as the case may be, opposite the rear transverse face 34 of the body 16 and, likewise, the rear ramp 46 extends opposite the front transverse face 38 of the rod 30.

In this initial position, if the chamber 20 is subjected to a negative pressure during the operation of purging of the circuit after its initial filling on the assembly line of the vehicle, the piston cannot be displaced forward because of the presence of the end stop 40 forming an axial wedge, and thus the purging can be carried out without it being interrupted by an inadvertent blocking of the orifice 22 by the piston 20.

Once the mounting and purging have been completed, the first actuation by means of the rod 30 will cause the automatic retraction, or dismounting, of the temporary and stop 40 without any particular deliberate intervention by the operator or the driver.

This is because, due to the displacement along the direction A of the rod 30 with respect to the cylinder body 12, the two ramps 44 and 46 cause a displacement of the end stop, radially outwards overall, and thus a corresponding elastic deformation of the central clip 42 which is unclipped from the cylindrical segment 36 of the rod 30.

The end stop 40 is thus dismounted automatically, and the transmitter is then in a normal configuration of use.

The removable end stop 40 may be delivered mounted on the rod 30 by the manufacturer of the transmitter 10 in order to carry out its function during the assembly of the vehicle on the assembly line.

In the also be refitted subsequently during the life of the vehicle on the occasion of purging as a result of a repair or a maintenance operation.

It may also, in a variant which is not represented, be produced from the same material and in a single piece, by molding, with the rod 30 or the body 16 and include a fracture initiator allowing it to be automatically separated upon the first actuation of the rod 30.

The design according to the preferred embodiment which has been described does not require any modification to the design and the manufacture of the known hydraulic transmitters.

It may also be used when a sealing bellows surrounds the rear end segment of the cylinder body 16 and the rod 30.

By virtue of the design according to the invention, making use of the removable end stop 40, it is, needless to say, possible to use a very lightly rated return spring 24, for example with a return-force value equal to a few Newton.

It is also possible to dispense completely with the compression spring 24 or any equivalent means internal to the device and applying a return force to the piston 18.

Furthermore, the invention finds a particularly advantageous application in the case of the procedures for filling and installing such a device on a vehicle, in which the device is delivered, before it is mounted onto the vehicle, in a state known as pre-filled state.

In fact, it may be desirable for the hydraulic device, and for example a clutch transmitter, to be completely or partially filled before it is installed on the vehicle, that is to say before fixing of the body onto the vehicle and before the connection of the pedal to the rod 30, 32.

Needless to say, in order to be able to carry out pre-filling of the device, it is necessary for the automatic resupply passage to be clear and for the piston to be in its rest position.

To that end, it is necessary either to use a compression spring, applying to the piston a return force of a sufficiently high value, or else to have a mounting simulating the installation of the device on a vehicle in order to be able to carry out pre-filling, the mounting including, for example, the equivalent of a "dummy" pedal.

By using a removable end stop in accordance with the teachings of the invention, it is thus possible to implement a method of pre-filling of the device for which the end stop is in place on the actuating rod during the pre-filling operation, thus guaranteeing that the piston occupies its rest position.

On completion of the pre-filling operation, the end stop can be removed from the actuating rod or left fitted until delivery of the pre-filled device and the installation thereof on the vehicle, the temporary end stop then being unclipped automatically under the effect of the first actuating force applied to the actuating rod after mounting on the vehicle.

What is claimed is:

1. Hydraulic device including a cylinder in which a piston is mounted for sliding in leaktight fashion in the body of the cylinder so as to delimit at least one hydraulic chamber intended to be linked to a hydraulic circuit, and is linked to the front extremity of an actuating rod which projects axially rearward outside the cylinder body and on which an actuating force can be applied in order to cause forward displacement of the piston, wherein said device includes a temporary end stop which limits the forward displacement of the piston and which intervenes until the piston is first actuated by means of the actuating rod, wherein the temporary end stop limits the axial forward displacement of the actuating rod, with respect to the cylinder body, and wherein the temporary end stop is a component fixed onto at least one of the actuating rod and the cylinder body, which is capable of occupying a fitted, end-stop position and a retracted position.

2. Device according to claim 1, wherein the end stop is fixed by elastic clipping.

3. Device according to claim 2, wherein the end stop includes means forming a ramp which interact with a facing portion of the cylinder body and/or of the actuating rod in order to cause automatic unclipping of the end stop under the effect of the actuating force applied to the actuating rod which entails a relative forward displacement of the actuating rod with respect to the cylinder body.

4. Device according to claim 2, wherein the end stop includes a central fixing segment in the form of an elastic clip capable of being clipped elastically, in the radial direction, onto a complementary segment of the actuating rod.

5. Device according to claim 4, wherein the end stop, at least at one of the extremities of its central fixing segment, includes a free end segment shaped into an inclined ramp and which is capable of interacting with a facing surface of the rear extremity of the cylinder body or of a radial shoulder of the actuating rod so as to cause the end stop to be disengaged in an overall radially outwards direction.

6. Device according to claim 5, wherein, in position, fitted on the actuating rod, the end stop is mounted for axial sliding along the actuating rod.

* * * * *